United States Patent [19]

Fukasawa et al.

[11] Patent Number: 5,248,459
[45] Date of Patent: Sep. 28, 1993

[54] METHOD OF MANUFACTURING MOLDED RESIN FOAM AND APPARATUS THEREFOR

[75] Inventors: Yukio Fukasawa, Suita; Hisatoshi Fukui, Toyonaka; Shiro Tojo, Settsu, all of Japan

[73] Assignee: Kanegafuchi Chemical Industry Co., Ltd., Osaka, Japan

[21] Appl. No.: 730,789

[22] PCT Filed: Nov. 26, 1990

[86] PCT No.: PCT/JP90/01532

§ 371 Date: Jul. 23, 1991

§ 102(e) Date: Jul. 23, 1991

[87] PCT Pub. No.: WO91/08102

PCT Pub. Date: Jun. 13, 1991

[30] Foreign Application Priority Data

Nov. 25, 1989 [JP] Japan .................................. 1-306252

[51] Int. Cl.⁵ .............................................. B29C 67/22
[52] U.S. Cl. .................... 264/40.4; 264/40.5; 264/51; 264/328.7; 425/4 R; 425/140
[58] Field of Search ............... 264/40.4, 51, 45.4, 264/40.1, 40.5, 328.7; 425/140, 4 R

[56] References Cited

U.S. PATENT DOCUMENTS

| | | | |
|---|---|---|---|
| 3,424,827 | 1/1969 | Galizia et al. | 425/140 |
| 3,800,018 | 3/1974 | Charpentier | 264/53 |
| 3,953,739 | 4/1976 | Colombo et al. | 425/140 |
| 4,482,306 | 11/1984 | Hahn | 264/40.4 |
| 4,504,436 | 3/1985 | Louvier | 264/321 |
| 4,613,471 | 9/1986 | Harris | 425/140 |
| 4,615,849 | 10/1986 | Hahn | 264/40.4 |
| 4,822,542 | 4/1989 | Kuwabara et al. | 264/40.4 |

*Primary Examiner*—Allan R. Kuhns
*Attorney, Agent, or Firm*—Flynn, Thiel, Boutell & Tanis

[57] ABSTRACT

A method of manufacturing a molded resin foam by charging pre-expanded resin pellets into a cavity of a mold and subjecting them to expansion molding. In order to minimize differences in weight of the foam from product to product, the method is characterized in that prior to charging, the apparent density of the pre-expanded resin pellets is measured and, upon charging, the cracking width of the mold is regulated, on the basis of the measurement result, to a definite value determined depending upon the apparent density, whereby the weight of the pellets charged in the mold cavity is made constant. An apparatus for carrying out the method is characterized by providing an automatic expansion molding machine with an arrangement (2,3,4) for sampling a feedstock from a feed-stock hopper (1) and measuring its apparent density before molding, equipment (8) for measuring a current mold-closing position which interlocks with a mold opening or closing positioner (9), and a computer automatic cracking width control device (10) for obtaining the inputs of measured apparent density value and current mold-closing position from the former two, computing an optimal cracking width based on apparent density according to a program prepare beforehand, closing a hydraulic feed line for mold closing of a hydraulic mold opening or closing unit (11–16), and stopping the mold-closing at a position of the optimal cracking width.

5 Claims, 1 Drawing Sheet

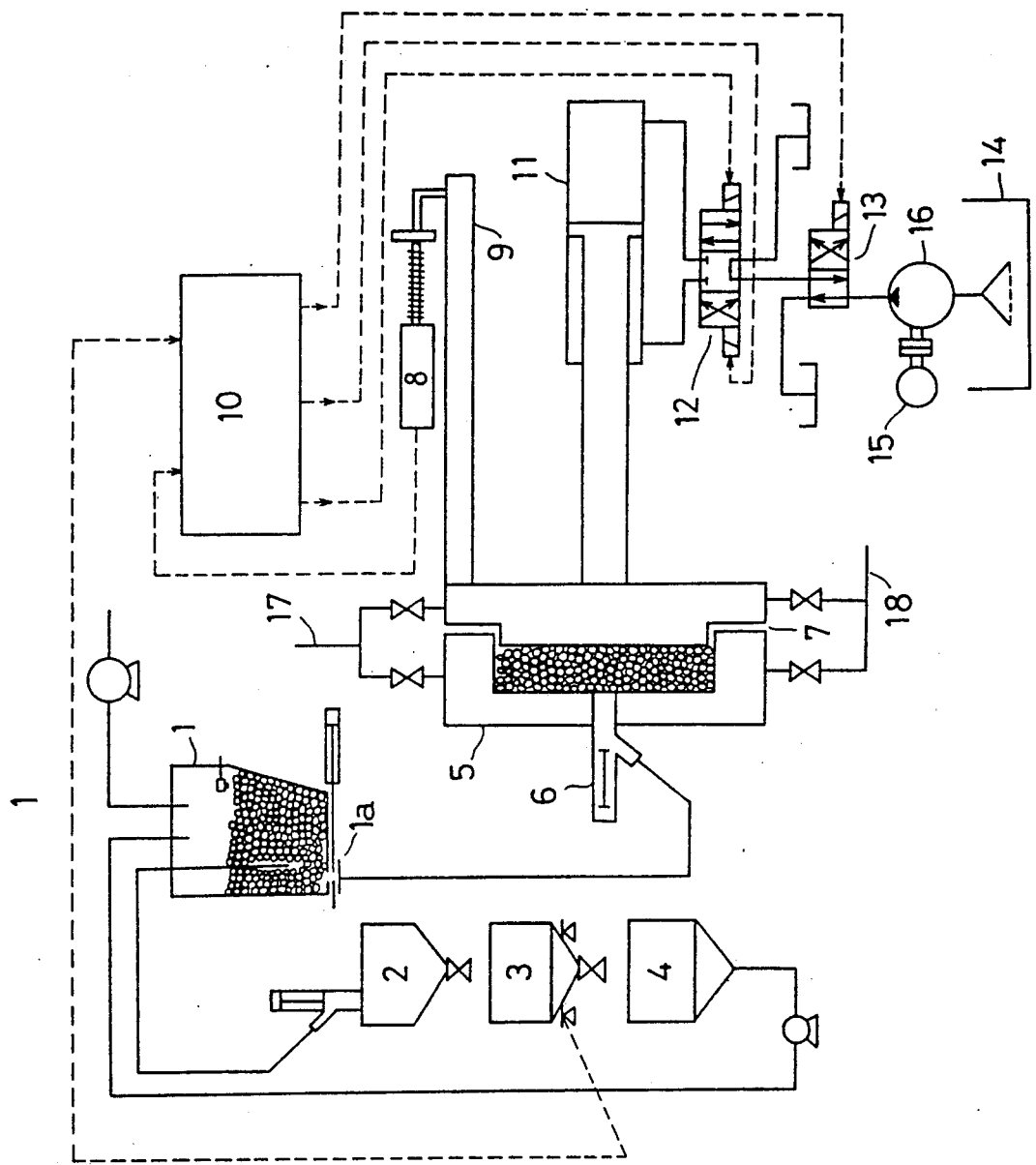

METHOD OF MANUFACTURING MOLDED RESIN FOAM AND APPARATUS THEREFOR

TECHNICAL FIELD

This invention relates to a method and an apparatus for manufacturing a molded resin foam, wherein pre-expanded resin pellets or granules are filled in a mold cavity and subjected to expansion molding under heating to produce energy absorbers such as automobile bumper core materials, planks, containers, shock-absorbing packaging materials, e.g. side pads, etc. More particularly, the invention is concerned with the production of a molded resin foam, in which the weight of the pre-expanded resin pellets to be charged to the mold cavity is made constant, whereby foam products are yielded with minimized differences in weight.

BACKGROUND ART

As represented by bead molding technique of expandable styrene beads in a mold cavity, the expansion molding of pre-expanded pellets of a resin such as styrene resins, olefine resins, e.g. polyethylene, polypropylene, etc. or the like has hitherto been known widely. This comprises the charging of pre-expanded resin pellets into a mold cavity and meld-bonding them by steam heating followed by cooling to yield a molded product conforming to the mold contour. With this method, the charging procedure is generally conducted in such a manner that when the pre-expanded pellets are discharged from a feed-stock silo attached to a molding machine through charging equipment into the cavity of mold, the mold is not completely closed, but the mold sections are spaced apart at a clearance or gap, which is called a cracking (hereinafter the term "cracking" will be used), on the order of 0–20 mm, usually 2–8 mm and thereafter, the pre-expanded pellets are charged through the charging equipment into the mold cavity by blowing compressed air into it, thus taking advantage of suction and entrainment actions of the pre-expanded pellets.

In this case, spacing the cracking is aimed at filling the prefoamed pellets equally and homogeneously in the mold cavity by releasing the air blown therein. The mold is constructed so that even if the cracking width is larger than the diameter of the prefoamed pellets, the prefoamed pellets, when charged, ay not leak out of the mold. In spite of the fact that if the apparent density of prefoamed pellets varies, the weight of the resulting molded products will naturally vary, the method usually carried out does not take account of controlling the difference in apparent density thereby to decrease the difference in weight of the molded products. Hence, it is a common practice that the difference in weight of molded products is taken for granted. As a consequence, by taking account of the difference in weight of the molded products when produced according to the current molding method in advance, the standard in weight or expansion ratio of the products is made broad to some degree, whereby quality control (in weight) is performed.

In a situation where the weight of molded foam is measured and found to be off the standard, a worker on-site knows that the manipulation of the cracking width of the mold enables the rectification of the weight of product (expansion ratio) and he may cope with the situation on the basis of his skill by manual operation of the cracking. However, it is virtually impossible to make such adjustment frequently, even if a few times might be possible. Furthermore, in cases where prefoamed pellets disperse more than usual, the frequency of manual operation to the cracking width is increased, and consequently, in the status quo, there is practically no way of taking countermeasures.

No matter how preferable it is to enhance the quality of products by narrowing the current prevailing range of standard of product weight, the manufacturing method now in practice still has limitations as it is.

For instance, in the application of a foam material to an automobile bumper core material or the like, in which the foam serves to absorb the energy upon collision, the difference in expansion ratio of the foam directly leads to a difference in energy absorption magnitude and causes significant differences in that function with the result that excessive safeguard design against collision is necessitated. Minimizing the difference in expansion ratio of a bumper core material to the utmost is therefore desired by all means.

Also, in another example, it goes without saying that a small difference in expansion ratio of foam products is advantageous in quality or economic aspect.

In the manufacturing method of a foamed product by expansion molding of prefoamed resin pellets in a mold cavity as described above, such an approach to expansion molding has not yet been found so that the quality of products can be enhanced by making the standard range in expansion ratio of the products narrower than the current method and, nevertheless, the yield of products can be maintained at the same level as the current method. There has not been found such an expansion molding technique that, even if the apparent density of prefoamed resin pellets is more or less varied more than usual, molding is nonetheless enabled.

In view of the foregoing problems the prior art method poses, the present inventors have intensively searched for a molding method capable of solving these problems and come to the conclusion that, in the current method, weight differences of foamed products is impossible to reduce insofar as the differences in expansion ratio of prefoamed resin pellets as a feed-stock for expansion molding is not reduced. We have improved on the current method by measuring the apparent density of each feed-stock to be used, which has never been taken into account in the current methods, and obtaining each cracking width value, which governs the volume of mold charging, by the use of the resulting measurement values, thus automatically controlling the cracking width On the basis of this improvement, we have completed this invention that is capable of minimizing the weight differences of molded products.

That is, with a view toward solving the foregoing problems, the present inventors have intensively investigated into the causes as to why the expansion ratio of molded foams varies. As a result, we have found out that the prefoamed pellets as a feed-stock are difficult to expand in the same expansion ratio from pellet to pellet because of their manufactural limitations. They are a mixture of pellets having an expansion ratio distribution which is centered on a target expansion ratio and ranges on both sides of it, and even to expand the mixture strictly in an average expansion ratio of the target value is generally difficult. Accordingly, it is difficult to diminish the weight differences of molded products in the current molding method, which neglects the differences in expansion ratio of their feed-stock, insofar as the prefoamed pellets are supplied to foaming molding.

From the sampling and weighing of a definite volume of prefoamed resin pellets to be charged into a mold cavity, it has also been proved that the prefoamed pellets as stated above cause classification when delivered into a stock silo and transferred from the silo to a raw material hopper for a molding machine and, consequently, produce a wide difference in weight thereof, though it depends on the kind of prefoamed pellets.

This invention has been discovered on the basis of the foregoing findings and is aimed at making the weight of prefoamed pellets constant, thereby enabling manufacture of a molded resin foam with a minimized difference in weight.

DISCLOSURE OF THE INVENTION

The manufacturing method according to this invention suited to the foregoing object is characterized in that in a process for manufacturing a molded foam comprising charging pellets or granules of a prefoamed resin into a cavity of mold and subjecting them to expansion molding, prior to charging, the apparent density of the prefoamed resin pellets is measured and, on the basis of the measurement result, the cracking width of the mold sections is regulated so that the weight of charged pellets may be constant, whereby differences in weight of the resulting foamed products is minimized.

In the present manufacturing method, the frequency of measurement of the apparent density followed by setting of the cracking width is preferred to be every molding shot, but may be every several shots provided that the apparent density of prefoamed pellets is stabilized.

It is advantageous that the measurement of apparent density is made with a batch of prefoamed pellets immediately before charging them into a mold cavity or its adjacent batch of ones and automatic regulation of the cracking width is conducted.

It may be occasionally necessary to set upper and lower limits of the cracking width, judging from the molding situations. In that case, the lower limit value is such that the escape of air upon charging is not impeded and non-uniformity of charging doesn't take place, for example, 1 mm whereas the upper limit value is such that no excessive charging is made to a degree that prevents the passage of steam at the subsequent heating step and causes insufficient inner fusion of molded product, for example, 20 mm.

In molding, after the cracking width is regulated and prefoamed pellets are charged into the mold cavity, the cracking width is brought into a closing state, and heating and cooling are performed, as is the case with customary molding procedure.

Further, this invention provides an apparatus for carrying the aforesaid method into effect which is constructed of an automatic expansion molding machine, including a feed-stock hopper, a feed-stock charger, a mold, a hydraulic mold opening and closing unit, a mold opening or closing positioner and a mold heating or cooling system. The apparatus is characterized by the further provision of an arrangement for sampling a portion of feed-stock from the feed-stock hopper and measuring its apparent density before molding; equipment for measuring a current extent of mold closing which is provided at the mold opening or closing positioner to interlock therewith; and a computer automatic cracking width control device for obtaining the inputs of measured apparent density and current extent of mold closing from the former two, computing an optimal cracking width determined depending on the apparent density according to a program prepared beforehand, and closing a hydraulic feed line for closing of the hydraulic mold opening or closing unit to stop the mold closing at a position of the optimal cracking width.

In the aforementioned apparatus, the position of the optimal cracking width may be somewhat varied owing to the change in oil temperature of the hydraulic unit and difference in response time of the control system.

Consequently, it is effective to measure the deviation and conduct automatic operation and correction in the next molding. This invention is also characterized by controlling to that end by means of a computer automatic cracking width control device.

The resin to be employed in this invention includes polystyrene, acrylonitrile-styrene copolymer, polymethylmethacrylate, polyethylene/polystyrene composite polymer, polypropylene, propylene-ethylene random or block copolymer, propylene-ethylene-butene terpolymer, low-density polyethylene, low-density linear polyethylene, medium-density polyethylene, high-density polyethylene, ethylene-vinyl acetate copolymer, ethylene-acrylic acid or metal acrylate copolymer, polybutene-1, poly-4-methylpentene-1, etc., but should not be construed as being limited to these examples.

In particular, propylene-ethylene copolymer or polyethylene series resins are preferred.

The prefoamed pellets of the resin to be employed in this invention may be prepared by any methods and are not limited. There are enumerated, for example, prefoamed pellets prepared by placing resin pellets impregnated with a volatile foaming agent or inorganic gas in a prefoaming machine followed by heating with steam; prefoamed pellets prepared by dispersing and suspending a volatile foaming agent, olefinic resin pellets and dispersing agent in water in a pressure-resistant sealed vessel, elevating the temperature to a required temperature under a required pressure and releasing the olefinic resin pellets and water into a reduced pressure area; prefoamed pellets prepared by heating and kneading an olefinic resin and foaming agent in an extruder, cooling, extruding the mixture through a multihole die equipped at the top of the extruder as foamed strands and cutting the strands with a cutter in an appropriate length; or any other pellets prepared by any method.

For bumper core materials or vibration-absorbing packages, at the outset, the expansion ratio of a molding material is determined to accommodate the performances or quality required for the final product and such prefoamed pellets that have an apparent density adapted to the expansion ratio are selected At this time, the prefoamed pellets do not have an identical expansion ratio from pellet to pellet, but are a mixture of foam pellets having a distribution in expansion ratio. Moreover, it is difficult to expect that prefoamed pellets having a strictly constant apparent density be always supplied for expansion molding.

Therefore, generally, a variation in apparent density of foaming materials to some degree is conceded and concomitant variation in weight of the molded products is considered to be unavoidable.

Also, in this invention, such usual prefoamed pellets having a distribution in expansion ratio and an allowance in apparent density are used for the prefoamed resin pellets material.

When a molded foam is manufactured by the application of the manufacturing apparatus and method as described above, the optimal cracking width is obtained, for example, by the following formulae:

1) Theoretical formula for a rectangular parallelepiped shape (square bar, plank, etc.)

Let the meanings of symbols be:
the longitudinal dimension of mold = A (cm)
the transverse dimension of mold = B (cm)
the dimension in thickness direction (opening or closing direction) of mold = C (cm)
the cracking depth = D (mm), and the mold charging volume E at a cracking width of 0 mm is represented by $$E = \frac{A \times B \times C}{1000} \text{ (g/l)}$$

and the increment F of mold charging volume at a cracking width of D (mm) is represented by:

$$F = \frac{A \times B \times 0.1 D}{1000} \text{ (g/l)}.$$

On the other hand, assuming that the measured apparent density of the prefoamed pellets is $\rho$ (g/l) and the median value of standard product weight is X (g), the required charging volume G to the mold is: $G = X/\rho(l)$. Since there is a relation of $G = E + F$, the optimal cracking width D is represented by:

$$D = \frac{\frac{1000 X}{\rho} - A \times B \times C}{0.1 \times A \times B}$$

2) Correction of the theoretical formula with a rectangular parallelepiped shape When the molding is actually performed, deviation from the theoretical formula may occur. Accordingly, in order to correct the theoretical formula, the median standard value of product weight is multiplied by a deflection coefficient $\alpha$ and the following formula is used instead:

$$D = \frac{\frac{1000 X\alpha}{\rho} - A \times B \times C}{0.1 \times A \times B}$$

3) Formula for a profile shape

In the case of molding of a profile shape, the mold charging volume E (g/l) at a cracking depth of 0 (mm) and area S (cm²) of the matched portions of male and female mold sections are measured, and the following formula is adopted:

$$D = \frac{1000 \times \left(\frac{X\alpha}{\rho} - E\right)}{0.1 \times S}$$

Thus, when a molded foam is manufactured according to this invention by determining an optical cracking width value according to the program formulae indicated above and regulating the cracking width of the mold to the value obtained, the cracking width is made small when the apparent density is large and, conversely, the cracking width is made large when the apparent density is small. Thereby, the weight of prefoamed pellets charged into the mold is made constant and, as a result, the weight (the same meaning as the expansion ratio) of the molded foam thus obtained is made constant.

In this way, differences in expansion ratio of the resulting molded foams are minimized and product quality is enhanced.

BRIEF DESCRIPTION OF THE DRAWINGS

FIG. 1 is a schematic illustration showing one example of an apparatus for carrying out the production method according to this invention.

BEST MODE FOR CARRYING OUT THE INVENTION

Examples of this invention will be further described hereinbelow.

In the single figure, the respective reference numerals designate: 1 a feed-stock hopper, 1A its feed portion, 2 to 4 a measurement arrangement for apparent density of prefoamed resin pellets according to this invention, 5 a pair of male and female mold sections, 6 a feed-stock charger, 7 a cracking width (clearance between male and female mold sections) to be automatically controlled according to this invention, 8 a measurement device for mold-closing positioner 9, 10 a computer automatic control device of cracking width. The computer automatic control device of cracking width 10 serves to input the measurement values of apparent density of a feedstock immediately before molding from the weighing equipment 3, input the current mold closing position from the measurement device for current mold-closing position 8, compute an optimal cracking width according to a program beforehand prepared and close a hydraulic feed line for closing of a hydraulic mold opening or closing unit described below, thus stopping the mold closing at a position of the aforesaid optimal cracking width. The computer-automatic control device of cracking width 10 includes a mechanism for measuring a deviation between the actual mold-closing stop position and the computed setting position of mold-closing position and conducting automatic operation and correction for that in the next cycle of molding.

The reference numerals 11 to 16 designate a hydraulic unit; 17 designates a supply line of steam for heat molding or cooling water and 18, a drain pipeline.

The apparent density measurement arrangement includes a constant volume sampler 2, weighing equipment 3 and a receiver tank 4. The prefoamed pellets after weighing are returned to the feed-stock hopper 1.

In the hydraulic unit, the reference numeral 11 designates a hydraulic cylinder and 12, an electromagnetic valve for mold opening or closing which has positions of mold closing, stop, and mold opening from the left side. The reference numeral 13 is an electromagnetic valve for hydraulic pressure supplying which has positions of stop supplying on the left and supplying on the right. The reference numerals 14, 15, 16 are an oil sump, a motor and a hydraulic pump, respectively.

The figure as viewed shows the state of cracking stop.

Now experimental examples utilizing the apparatus shown in the figure will be described.

Experimental Example 1

A square bar made of polypropylene expanded in an expansion ratio of 15 times was formed by the beads molding technique in a mold cavity.

Pre-expanded beads used in this example were expanded from a propylene random copolymer having a basic density of 0.9 g/cc and varying from 49 g/l (18.4 times) to 55 g/l (16.4 times) in apparent density (apparent expansion ratio).

One evaluation unit was prepared by mixing five flexible containers (200 kg in total) of prefoamed beads with different apparent densities, each flexible container having a 40 kg capacity.

In order to impart expansion power to the pre-expanded beads during molding, pressure treatment was applied, before molding, to the pre-expanded beads under heating by compressed air so that the air pressure inside the beads may be ca. 2 atm.

The configuration of mold used for the square bar in this example (here, it means a configuration of the space to be charged) was a rectangular parallelepiped having dimensions of 1000 mm in longitudinal length, and 160 mm in transverse length and thickness. Being expected to have a dimensional shrinkage of 2.5% in respective directions, the resulting molded product has a size and volume of approximately 975 mm in length and 156 mm in transverse length and thickness, and 23.7 liters.

Assuming that final products of this square bar should have an expansion ratio standard of 15±2 times, such products that have the following weight range in dried state after molding are acceptable:

Weight standard of products (unit;gr.)=1255(min. value)≈1422(median value)≈1641(max. value)

Here, the weight can be computed according to the formula:

$$\frac{\text{volume of molded product}}{\text{weight of molded product}} \times 0.9 \text{ (density of}$$

basic material) = expansion ratio of molded product

Likewise in the case of a narrowed expansion ratio standard of 15±1 times, acceptable are:

Weight standard of products (unit;gr.)=1333(min. value)≈1422(median value)≈1641(max. value)

The program for computing cracking width control values from measurements of apparent density was based on the theoretical formula regarding the computing formula of cracking width for a rectangular parallelepiped shape as stated above, and the formula given below was used except for the cases below where the computed cracking widths were not less than 20 mm and not more than 1 mm:

1) Where the computed cracking width is in the range of 1-20 mm:

$$\text{Cracking width} = \frac{\frac{1422 \times \alpha}{\text{apparent density}} - 25.6}{0.16} \text{ (unit; mm)}$$

($\alpha$: a coefficient of deviation between charged weight and molded weight and here, assumed to be 0.1)

2) Where the computed cracking width is not less than 20 mm:
   Cracking width=20 mm 3) Where the computed cracking width is not more than 1 mm:
   Cracking width=1 mm Evaluation was made of expansion molding in this way and the end results obtained are shown in Table 1 together with those of the comparative examples.

TABLE 1

| Evaluation Item | Comparative Ex. | This Experimental Ex. |
|---|---|---|
| Apparent density of prefoamed beads (g/l) (flexible container unit) | 49.2<br>50.3<br>52.6<br>53.3<br>54.8 | 49.1<br>50.3<br>52.1<br>53.4<br>55.0 |
| Cracking width | fixed to 8 mm | Automatically controlled:<br>average = 6.3 mm<br>max = 18.7 mm<br>min = 1.0 mm |
| Number of moldings | 142 | 147 |
| Average weight (gr) | 1431 | 1417 |
| Maximum weight (gr) | 1822 | 1583 |
| Minimum weight (gr) | 1232 | 1345 |
| Max. − Min. (gr) | 590 | 238 |
| Standard deviation (gr) | 105 | 41 |
| Product yield (%) (15 ± 2 times) | 97.2 | 100 |
| Product yield (%) (15 ± 1 times) | 66.9 | 97.3 |

As seen from Table 1 above, the present experimental example of this invention yielded clearly superior results as compared with the comparative example according to conventional molding. The product yield was more than 95% though the product standard was altered from 15±2 times to 15±1 times, and so, commercial production is feasible.

Experimental Example 2

A plank of expanded polyethylene with a factor of 27 was formed by molding of its beads in a mold cavity.

Pre-expanded beads used in this example were expanded from low-density cross-linked polyethylene having a basic density of 0.92 g/cc to vary from 23 g/l (39.1 times) to 24 g/l (37.5 times) in apparent density (apparent expansion ratio). Three flexible containers (90 kg in total) of pre-expanded beads with different apparent densities were mixed to make one evaluation unit, each flexible container having a 30 kg capacity.

The mold (configuration of their space to be charged) for the plank in this example is fashioned in the form of a rectangular plate having dimensions of 1288 mm in longitudinal length, 975 mm in transverse length and 42.0 mm in thickness. The resulting moldings turned out, from the past empirical data, to have an approximate size and volume of 1230 mm in longitudinal length, 930 mm in transverse length and 40.5 mm in thickness and 46.3 l, on the average.

Provided that the expansion ratio standard of the final products of the plank was 27±3 times and when their weights are computed according to the formula of:

$$\frac{\text{Volume of molded product}}{\text{Weight of molded product}} \times 0.92 \text{ (density of}$$

basic material) = Expansion ratio of molded article, products having the following range of weights in dried state after molding are rendered acceptable:

Product weight standard (unit;gr)=1496(min.value)≈1579(median value)≈1672(max. value)

The following formula was used as a program for computing regulated values of cracking width from measurements of apparent density:
1) Where the cracking width computed is 1-20 mm, $$\text{Cracking width} = \frac{1579 \times \alpha}{\frac{\text{Apparent density}}{1.27}} - 52.7 \quad \text{(unit; mm)}$$

($\alpha$: coefficient of deviation between charged weight and molded weight, and in this case, chosen to be 1.03).
2) Where the computed cracking width is not less than 18 mm,
Cracking width = 18 mm.
3) Where the computed cracking width is not more than 1 mm,
Cracking width = 1 mm.

Evaluation was made with respect to expansion molding of this example, and results obtained are shown in Table 2 given below, together with those of a Comparative example.

TABLE 2

Results of Evaluation to Expansion Molding

| Evaluation Item | Comparative Ex. | This Experimental Ex. |
|---|---|---|
| Apparent density of prefoamed beads used (g/l) (flexible container unit) | 23.0<br>23.6<br>24.1 | 23.0<br>23.4<br>24.0 |
| Cracking width | fixed to 12 mm | Automatically controlled: average = 11.9 mm<br>max. = 15.2 mm<br>min. = 9.6 mm |
| Number of moldings | 55 | 56 |
| Average weight (gr) | 1583 | 1575 |
| Max. weight (gr) | 1685 | 1622 |
| Min. weight (gr) | 1426 | 1528 |
| Max. − Min. (gr) | 259 | 94 |
| Standard deviation (gr) | 42.3 | 15.6 |
| Product yield (weight) (27 ± 3 times) | 100% | 100% |
| Product yield (weight) (27 ± 1.5 times) | 81.8% | 100% |
| Rejected number due to excessive shrinkage | 9 (light-weight) | 1 |
| Final product yield (27 ± 3 times) | 83.6% | 98.2% |
| Final product yield (27 ± 1.5 times) | 65.5% | 98.2% |

As will be seen from Table 2 above, the present experimental example yielded apparently good results as compared with the comparative example according to conventional molding. The product yield was 98.2% even though the product standard was changed from 27±3 times to 27±1.5 times, which enables commercial production.

The more lightweight the products are, the more susceptible they are to influences of heating conditions upon molding and drying conditions after molding, even if within the weight standard and, as a result, the molded products have a tendency to shrink. Such molded products that are short of the dimensional standard are therefore treated as rejected products. In this experimental example, it is apparent that the reduction of dispersion in product weight diminishes lightweight products and accordingly, reduces rejection due to molding shrinkage.

As described above, this invention provides a method of manufacturing a resin molded foam in a mold cavity by charging resin prefoamed pellets into the mold cavity and subjecting them to foaming molding under heating and is designed to make the charging weight in the mold cavity constant by measuring the apparent density of the prefoamed pellets prior to charging and, on the basis of the results, regulating the cracking width of the mold. In no case have prior art molding methods taken account of the differences in apparent density of prefoamed pellets as a feed-stock and hence, it has been deemed difficult to decrease the differences in expansion ratio (weight) of the products and to enhance the quality more than the current situation. However, the experimental results of this invention show that the present manufacturing method tends to reduce significantly the differences in expansion ratio of products and not only enhances their quality, but also brings an economical benefit.

The claimed methods serve to enhance commercial practice of the aforesaid invention.

Further, the claimed apparatuses are suitable for the industrial practice of the methods stated above and advantageously permit the production of molded foams according to the methods above.

Industrial Applicability

The method and apparatus for manufacturing a molded resin foam pertaining to this invention are thus suited for obtaining products with low differences in weight, and the products are useful for energy absorbers such as automotive bumper core material, planks, containers, shock-absorbing packages such as side pads, or the like.

We claim:
1. In a method of manufacturing a molded resin foam product comprising the steps of charging pellets of a prefoamed resin into a cavity of a mold and subjecting the pellets to expansion molding by heating, said mold having a cracking width formed by the clearance between male and female mold members comprising the mold, the improvement comprising the steps of determining the apparent density of the prefoamed resin pellets prior to charging them into the mold, and adjusting the cracking width during the charging of the pellets according to the determined apparent density of the pellets before subjecting the pellets to expansion molding.

2. The method of claim 1, wherein the determining of the apparent density is conducted with a portion of the prefoamed resin pellets ready to be charged in the mold cavity or an adjacent portion of pellets.

3. The method of claim 1, wherein the adjusting of the cracking width is automatic.

4. In an apparatus for manufacturing a molded resin foam product comprising an automatic expansion molding machine having a feedstock hopper, a mold comprising male and female mold members having a cracking width provided therebetween, means for charging feedstock into said mold, hydraulic means for opening and closing said mold, positioner means of regulating the opening and closing of said mold and means for heating and cooling the mold, the improvement comprising said automatic expansion molding machine additionally having means of sampling a portion of said feedstock and determining its apparent density prior to charging said feedstock to said mold; means for determining the cracking width provided between said male and female mold members; and automatic computer means for regulating said cracking width based on the apparent density of said feedstock.

5. The apparatus for manufacturing a molded resin foam as set forth in claim 4, wherein said automatic computer means measures the deviation between an actual mold position and a computed mold position and, in a next molding cycle, conducts automatic computing and correction.

* * * * *